Patented Jan. 8, 1929.

1,697,936

UNITED STATES PATENT OFFICE.

ERNST TEUPEL, OF BERLIN-ZEHLENDORF, GERMANY, ASSIGNOR TO THEODOR OTTO, OF BERLIN, GERMANY.

SURFACE-PROTECTING PASTE.

No Drawing. Application filed May 31, 1927, Serial No. 195,593, and in Germany June 3, 1926.

Many substances, such as soot, dry coloring substances or dyes, oil and grease from machine and engine parts, tar, etc. adhere very strongly to surfaces with which they have come in contact, and it is generally afterwards very difficult to remove them therefrom, in that the ordinary purifying or cleansing agent prove insufficient. Other substances or compositions of matter, for instance powder and paint to be applied to the face, prove detrimental to the skin in the course of time, and also they cannot be removed without specially prepared agents. It is, furthermore, in some technical arts, for instance in the method of coating with lacquer by dispersion, in many instances desired to prevent the lacquer or other liquid substances, may be a liquid coloring substance, from coming in contact with certain portions or parts of the object to be treated, these portions or parts being now, prior thereto, provided with the protective paste which afterwards is removed from the respective portions or parts together with the lacquer or other coating, but it is important that said coating itself can be removed easily therefrom.

Now, the present invention relates to a protective paste answering all requirements, and to a method of manufacturing this paste. The invention consists therein that the paste is composed of sebacic salts of potassium and sodium, alkali- and earth-alkali-silicates, water and alcohol. A preferred composition, as regards the ingredients and their proportion, is the following: 18 parts of sodium soap, 9 parts of potassium soap, 22 parts of water-glass, 12 parts of talcum, and 90 parts of 20% alcohol.

The simultaneous presence of these substances is necessary, as well as sufficient, but immaterial is the kind of the sebacic acid of the earth-alkali-silicate and of the alcohol. Thus, for instance, the talcum may be replaced by silicate of lime or of alumina, and as alcohol all volatile water-soluble alcohols, as methanol, ethyl-alcohol, propyl-alcohol, and the like, may be used.

If the surfaces or surface portions to be protected are coated with this paste, there forms on them in a few seconds an uninterrupted layer or film, this layer or film being solid enough to be able to resist also some mechanical strain. Owing to its composition the film closes the pores of the surfaces or surface portions covered with it and prevents completely the undesired substance from entering into the pores and adhering to those surfaces etc. Nevertheless, the coating is sufficiently elastic to answer also the requirements which may exist in this respect, and finally, it is not sticky. If the face or any other part of the skin is coated therewith no disagreeable feeling and no detrimental consequence is experienced. The coating can be removed completely merely by means of water, and with it the dust or dirt or paint or lacquer or whatever other impurity or substance it may bear is removed together with it.

I claim:

1. A paste adapted to protect surfaces from dust, dirt and other substances otherwise tending to adhere thereto and to penetrate therein, said paste consisting of sebacic acid salts of potassium and sodium, alkali- and earth-alkali-silicates, water and alcohol.

2. A paste adapted to protect surfaces from dust, dirt and other substances otherwise tending to adhere thereto and to penetrate therein, said paste being composed of 18 parts of sodium soap, 9 parts of potassium soap, 22 parts of water-glass, 12 parts of talcum, and 90 parts of 20% alcohol.

In testimony whereof I affix my signature.

DR. ERNST TEUPEL.